Oct. 15, 1929.   W. C. GEER   1,731,486
ELECTRICAL INSULATION
Original Filed July 9, 1925

Inventor
William C. Geer
By
Pierson, Eakin & Avery
Attys.

Patented Oct. 15, 1929

1,731,486

UNITED STATES PATENT OFFICE

WILLIAM C. GEER, OF AKRON, OHIO, ASSIGNOR TO THE B. F. GOODRICH COMPANY, OF NEW YORK, N. Y., A CORPORATION OF NEW YORK

ELECTRICAL INSULATION

Application filed July 9, 1925, Serial No. 42,448. Renewed August 7, 1929.

This invention relates to cable construction and particularly to the cover or insulating shell of a cable and has for an object to provide an insulating cover for a cable which shall possess in a high degree the desired properties in such coverings and which shall at the same time be less expensive to construct than high grade insulation now in use.

In cable construction, it is essential that the cover or insulation have such low cold flow characteristics that the wire will not be displaced from its central position and thus alter the electrical characteristics of the cable. This exacting requirement has led to the use of gutta percha exclusively for ocean cables.

In accord with the present invention, I employ a cable insulation of two or more layers or covers, each layer having increasingly lower cold flow properties from the outside toward the center. For the inner cover, I may use gutta percha, or substances having substantially the same cold flow as gutta percha, such as a mixture of gutta percha and certain heat-plastic rubber isomers more fully below described, or mixtures of these heat-plastics and rubber, with or without gutta percha. The outer layers of relatively higher cold flow are preferably compositions of these heat-plastics and rubber having extremely low water absorption, and they may contain a minor portion of gutta percha if desired.

Figure 1:
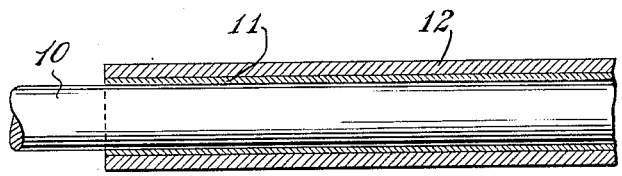
Figure 2:
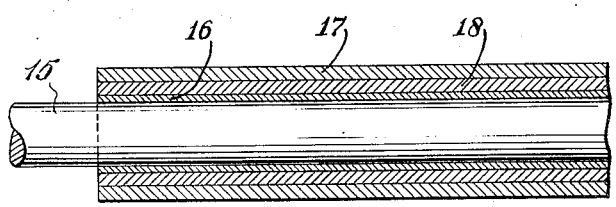

Of the accompanying drawings, Fig. 1 is a longitudinal section of a preferred embodiment of a cable structure built in accord with the present invention; and Fig. 2 is a similar view of a modification thereof.

The heat-plastic rubber isomers herein above referred to are prepared by the reaction of rubber with certain isomerizing agents for rubber having the general formula $R-SO_2-X$, wherein R represents an organic radical or a hydroxy group and X represents a hydroxy group or chlorine, and including organic sulfonic acids, organic sulfonyl chlorides, and sulfuric acid.

These heat-plastics, as described in the patent of H. L. Fisher, No. 1,605,180, patented November 2, 1926, are of two distinct types or classes: namely, tough, non-grindable balata-like products, and hard, friable, shellac-like products, the products of both classes being readily heat-plastic at moderate temperatures.

In practice, I find that the following tough, non-grindable heat-plastic isomers of rubber to be especially satisfactory as ingredients for cable constructions: (1) the reaction product of an intimate mixture of 7½ parts by weight of p-phenol sulfonic acid and 100 parts of rubber, when heated in a compact mass from 4 to 10 hours at 250 to 290° F.; or, reaction products in which the phenol sulfonic acid is replaced by any of the following: p-toluene sulfonyl chloride, 9 parts; p-toluene sulfonic acid 7 parts; or other acids or acid mixtures of the character herein indicated, approximately 7 parts; (2) a similar heat-plastic product formed by the reaction of 4 to 5 parts by weight of concentrated sulfuric acid (sp. gr. 1.84) intimately mixed with 100 parts of rubber and 2 to 50 parts of pine tar, when heated in a compact mass from 5 to 7 hours at 268° F.

The hard, grindable heat-plastic isomers of rubber suitable as ingredients for cable compositions include the following which are here given by way of example: the reaction product of 8 parts by weight of p-toluene sulfonic acid and 2 parts of sulfuric acid (sp. gr. 1.84) with 100 parts of rubber, when intimately mixed therein and subjected to heat in a compact mass for about 8 hours at 268° F.; or, in place of the p-toluene sulfonic acid and sulfuric acid of the above example, any one of the following may be substituted: p-phenol sulfonic acid 15 parts, p-toluene sulfonyl chloride 12 parts, p-toluene sulfonic acid 13 parts, or 2 parts of concentrated sulfuric acid may displace 4 parts of these reagents last given.

Both the tough, non-grindable and the hard, friable heat-plastics have been found, upon analysis after removal of impurities, to consist of hydrocarbons having the same carbon and hydrogen ratio as in rubber, and further to be chemically less unsaturated than rubber. They have a higher specific gravity than rubber, being of the order of 0.970 to 1.005. These materials are employed for the purposes of the present application in their impure state, except for the washing in water to remove any excess acid, and may even be oxidized slightly from exposure to the atmosphere. The term "heat-plastic rubber derivatives" as used in this specification is intended to include either the purified or impure products above described and other reaction products of similar character however derived.

*Example I.*—Plastic composition having substantially the same cold flow characteristics as gutta percha, and suitable for the inner layer or cover of a cable, may be prepared as follows: 42.5 parts by weight of the hard, friable heat-plastic rubber derivative, 32.5 parts of the tough, non-grindable heat-plastic rubber derivative, and 25 parts of crude rubber are fluxed and mixed on a rubber mill. Preferably, the friable heat-plastic is melted on a hot rubber mill and the other two ingredients added in the order named. The resulting product has a deep black, uniform appearance and has cold flow properties substantially the same as gutta percha, and like gutta has an internal structure as shown by the whitening effect produced by stretching. I have found that the addition of a small amount of gutta, 5 to 20 parts, to the above plastic stabilizes the internal structure of the composition without changing its other properties materially. It is to be understood that higher percentages of gutta percha may be added to this composition if desired to more nearly simulate a gutta insulation. A preservative may also be added to give the composition good aging properties, 3 parts of the reaction product of carbon disulfide and para-amino dimethyl aniline having proved in practice to be satisfactory. The above compositions, whether or not they contain gutta, may be easily and smoothly calendered or tubed, and when cold are equal or superior to gutta percha with respect to cold flow, dielectric constant and water absorption. These compositions are herein termed for convenience "heat-plastic gutta substitutes."

The above described compositions represent my preferred class of gutta substitutes for the inner layer of a cable cover. The proportions of the ingredients therein may, however, be varied within rather wide proportions, an increase of the hard, friable heat-plastics giving thereto a lower cold flow and an increase of the tough non-friable heat-plastics or of rubber giving thereto a higher cold flow. Thus, satisfactory compositions of relatively low cold characteristics may be prepared by admixing gutta percha, or the above described heat-plastic gutta substitute, with varying amounts of the tough non-friable heat-plastics. To illustrate, the several layers of the insulation may be made of 75 parts of gutta, or of heat-plastic gutta substitute, and 25 parts of the tough non-friable heat-plastic; or of 50 parts of gutta, or gutta substitute, and 50 parts of the tough heat-plastics; or again of 25 parts of gutta, or gutta substitute, and 75 parts of the tough heat-plastics. These compositions just described are also herein termed for convenience "heat-plastic gutta substitutes."

*Example II.*—For the outer layer of the cable structure, I prefer to employ a composition of extremely low water absorption capacity. The following composition has proven to have this property in a high degree, but has a relatively higher cold flow than gutta, or the heat-plastic gutta substitute: 80 parts of a tough non-grindable heat-plastic rubber derivative, preferably the above described reaction product of 7½ parts of p-phenol sulfonic acid and 100 parts of rubber, are intimately mixed on a rubber mill with 20 parts of crude rubber (plantation A), 3 parts of napthalene, and 3 parts of aldol alpha-napthylamine. The mixture is thoroughly washed with warm water to remove water soluble impurities, dried in any suitable manner, and is then ready for application—as a layer of a cable cover. The composition herein termed for convenience "rubber and heat-plastic mixture" is easily and smoothly tubed and is of high water impermeability as well as of low water absorption capacity.

The construction of a cable insulation from the above materials involves two or more layers, as is readily seen from the accompanying drawing. In Fig. 1, I show a cable structure 10 having two layers of insulation, an inner layer 11 of gutta or the heat-plastic gutta substitute herein described, and an outer layer 12 of the rubber and heat-plastic mixture, a composition having a higher cold flow, but very low water absorption capacity.

It is obvious that three or more layers may be advantageously employed of graduated cold flow characteristics. Thus in Fig. 2, I show a cable structure 15 having an inner layer 16 of gutta, or the heat-plastic gutta substitute, an outer layer 17 of the rubber and heat-plastic mixture, and an intermediate layer 18 of a composition similar to outer layer but preferably having gutta or gutta substitute mixed therewith to give it a lower cold flow. It is plain that numerous graduations of cold flow characteristics may be obtained by a selection of ingredients in the compositions herein above described.

By the term "cold flow" as used in this specification is meant the extent to which a cylindrical rod when loaded with a fixed weight will sink into a flat sheet of plastic, insulating material supported on a rigid base during an extended period of time, the numerical value of the cold flow being expressed as the ratio of the depth of the depression to the thickness of the sample being tested, usually in terms of per cent. Thus, in one of the standard tests for cold flow, a test piece one inch square and ¼ inch in thickness is supported on a metal bar and a rod 0.14 inch in diameter placed across the test piece is loaded with a weight of 5½ pounds at normal room temperature during a period of 24 hours. The depression of the rod is measured before releasing the load, and the per cent of depression to the original thickness of the test piece computed.

In building any of the multiple-layered insulations, the different compositions are tubed successively by means of suitable tubing machines. I have found it to be desirable in some instances to coat a tubed layer with a thin cement made by dissolving the tough, non-friable heat-plastic in benzol or gasoline before tubing on a successive layer. This produces a stronger adhesion between the layers and tends to fill out any surface imperfections in under layers.

The constructions herein described have the advantage of low cost with maximum insulating properties. The inner layer of low cold flow material extends the areas of contact with the higher cold flow layers and thus minimizes the tendency for the wire to be displayed laterally in the insulation during long periods of standing in one position, and, further, a minimum quantity of the expensive gutta percha, or gutta substitute, may be employed in the cable structure.

It is obvious that numerous modifications and variations in the particular examples herein given may be made without departing from the principles of my invention and I therefore do not purpose to wholly limit the claims hereof to the specific compositions and constructions of this specification.

I claim:

1. A cable structure comprising an insulating cover consisting of a plurality of layers of plastic material, any inner layer having a lower cold flow than its contiguous outer layer.

2. A cable structure comprising an insulating cover consisting of a plurality of layers of plastic material, the layers having increasingly lower cold flow properties from the outer to the inner layer.

3. A cable structure comprising an insulating cover consisting of a plurality of layers of plastic material, the inner layer having a lower cold flow than any outer layer.

4. A cable structure comprising an insulating cover consisting of a plurality of layers of plastic material, the inner layer having cold flow properties substantially equal to gutta percha, and said inner layer having a lower cold flow than any outer layer.

5. A cable structure comprising an insulating cover consisting of a plurality of layers of plastic material, the inner layer being composed at least in part of gutta percha and having cold flow properties substantially equal to those of gutta percha, the layers having increasingly lower cold flow properties from the outside to the inner layer.

6. A cable structure comprising an insulating cover consisting of a plurality of layers of plastic material, the inner layer being composed at least in part of gutta percha and having cold flow properties substantially equal to those of gutta percha, and an outer layer having a material proportion of tough, non-grindable heat-plastic derivatives of rubber, said layer possessing a relatively higher cold flow than the said inner layer, any inner layer having a lower cold flow than its contiguous outer layer.

7. A cable structure comprising an insulating cover consisting of a plurality of layers of plastic material, the inner layer being composed of an admixture of hard, friable heat-plastic derivatives of rubber, tough, non-grindable heat-plastic derivatives of rubber, rubber and gutta percha, said mixture having cold flow properties substantially equal to that of gutta percha, the layers having increasingly lower cold flow properties from the outer to the inner layer.

8. A cable structure comprising an insulating cover consisting of a plurality of layers of plastic material, the inner layer being composed of an admixture of hard, friable heat-plastic derivatives of rubber, tough, non-grindable heat-plastic derivatives of rubber, rubber and gutta percha, said mixture having cold flow properties substantially equal to that of gutta percha, and an outer layer of a similar composition to which the increased proportion of tough, non-grindable heat-plastic derivatives have been added, the composition of said outer layer having a lower cold flow than the inner layer.

9. A cable structure comprising an insulating cover having a plurality of layers, the inner layer being composed of an admixture of hard, friable heat-plastic derivatives of rubber, tough, non-grindable heat-plastic derivatives of rubber, rubber and gutta percha in substantially the following proportions: friable heat-plastics 42.5 parts by weight, non-grindable heat-plastics 32.5 parts, rubber 25 parts, gutta percha 5 to 100 parts; the layers having increasingly lower cold flow properties from the outer to the inner layer.

10. A cable structure comprising an insulating cover having a plurality of layers, the inner layer being composed of an admixture of hard, friable heat-plastic derivatives of rubber, tough, non-grindable heat-plastic derivatives of rubber, rubber and gutta percha in substantially the following proportions: friable heat-plastics 42.5 parts by weight, non-grindable heat-plastics 32.5 parts, rubber 25 parts, gutta percha 5 to 100 parts; and the outer layer of a composition similar to that of the inner layer to 100 parts by weight of which has been added 25 to 300 parts of tough non-grindable heat-plastic derivatives of rubber, the composition of said outer layer having a higher cold flow than the mixture of the inner layer.

In witness whereof I have hereunto set my hand this 15th day of June, 1925.

WILLIAM C. GEER.